United States Patent [19]

Mattei et al.

[11] Patent Number: 4,585,919
[45] Date of Patent: Apr. 29, 1986

[54] PIERCING DEVICE FOR PIERCING VENTILATING HOLES IN CIGARETTES OR SIMILAR SMOKING COMMODITIES

[75] Inventors: Riccardo Mattei; Armando Neri, both of Bologna; Santo R. Gobbi, Pavia; Maichi Cantello, Aglie', all of Italy

[73] Assignee: G.D. Societa per Azioni, Bologna, Italy

[21] Appl. No.: 649,323

[22] Filed: Sep. 10, 1984

[30] Foreign Application Priority Data

Sep. 12, 1983 [IT] Italy ............................... 3558 A/83

[51] Int. Cl.⁴ ............................................. B23K 26/00
[52] U.S. Cl. ...................... 219/121 LK; 219/121 LQ; 219/121 LR; 219/121 LT
[58] Field of Search ............... 219/121 LK, 121 LL, 219/121 LP, 121 LQ, 121 LR, 121 LT, 121 LW, 121 LY; 131/281

[56] References Cited

U.S. PATENT DOCUMENTS 4,224,498  9/1980  Grollimund et al. .... 219/121 LY X

*Primary Examiner*—C. L. Albritton
*Attorney, Agent, or Firm*—Frost & Jacobs

[57] ABSTRACT

Piercing device for piercing holes in cigarettes or similar smoking commodities, in which a laser beam emitted by a continuous laser source is "pulsated" by a mobile reflecting element, assembled in rotary manner round a fixed axis, and a fixed reflecting element optically connected to the said mobile reflecting element and provided with a faceted reflecting body in the shape of an irregular pyramid designed to define, for each "pulse", a focus on the surface of the said cigarette being pierced, and endowed, in relation to the latter and throughout the length of the pulse, with relatively zero speed.

5 Claims, 5 Drawing Figures

PIERCING DEVICE FOR PIERCING VENTILATING HOLES IN CIGARETTES OR SIMILAR SMOKING COMMODITIES

BACKGROUND OF THE INVENTION

The present invention relates to a piercing device for piercing ventilating holes in cigarettes or similar smoking commodities.

For making so-called "ventilated" cigarettes, piercing devices are known to be employed on which the piercing "tool" consists of a laser source. On known types of laser beam piercing devices, cigarettes are generally pierced according to two techniques, the first using a laser source which pierces the said ventilating holes in the cigarettes as they turn round their own axis, and the second using mobile reflecting systems designed to divert the laser beam on to the cigarette being pierced in different directions, while the cigarette travels in relation to the said source without turning round its own axis.

In both the above cases, known types of laser beam devices use a "pulsating" laser source the frequency of which is such as to pierce a hole for each pulse.

The employment of a pulsating laser source, however, makes it practically impossible for the above known types of piercing devices to be used in conjunction with high-output cigarette manufacturing or filter assembly machines designed for producing as many as 10,000 cigarettes a minute.

For this to be done, the pulse frequency required for piercing about thirty holes in each cigarette is around 5,000 Hz, which means using relatively large, high-power laser sources. Furthermore, such pulse frequencies usually result in irregular, drawn-out holes of unacceptable appearance.

SUMMARY OF THE INVENTION

The aim of the present invention is to provide a laser beam piercing device designed to operate smoothly in conjunction with high-output cigarette manufacturing and filter assembly machines and which involves none of the above-mentioned drawbacks.

With this aim in view, the present invention relates to a piercing device for piercing ventilating holes in cigarettes or similar smoking commodities supported on a feeding drum assembled in rotary manner round an axis, the piercing device comprising a laser source and an optical reflecting and focusing system designed to divert the beam emitted by the said source and focus it, in succession, on specific points on the surface of each said cigarette, while the latter is travelling crosswise in relation to its own axis round the axis of rotation of the said drum; the said device being characterised by the fact that the said source is designed to emit a continuous beam along a fixed axis parallel with the axes of the said cigarettes and arranged along the same route, and that the said optical system comprises a mobile reflecting and focusing unit assembled in rotary manner round the said fixed axis, and a fixed reflecting member comprising two rings of reflecting elements arranged round the said fixed axis; the elements on one said ring being optically inserted between two reflecting elements on the said mobile unit and forming, with the perpendicular of the said fixed axis, angles varying from one element to another according to the formula:

$$a = (2\pi R + P \cos c)/4\pi 1$$

BRIEF DESCRIPTION OF THE DRAWINGS

Further characteristics and advantages of the present invention will now be described with reference to the attached drawings showing a non-limiting example and in which.

DETAILED DESCRIPTION OF THE INVENTION

Figure 1:
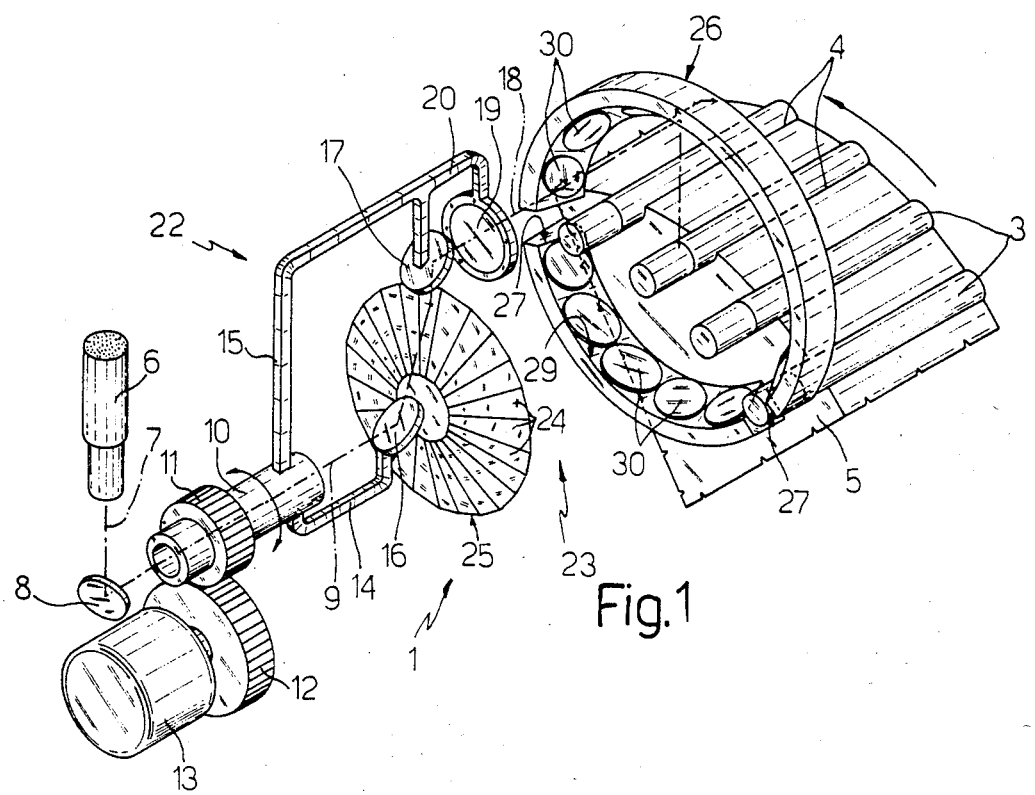
FIG. 1 shows a view in perspective of a preferred arrangement of the piercing device according to the present invention.

Number 1 in FIG. 1 indicates a piercing device designed to pierce a ring of holes 2 (FIG. 2) in a number of cigarettes 3. Each of the latter is partially housed in fixed position inside a seat 4 on the periphery of feeding drum 5 designed to turn round its own axis at a given constant speed.

Figure 2:
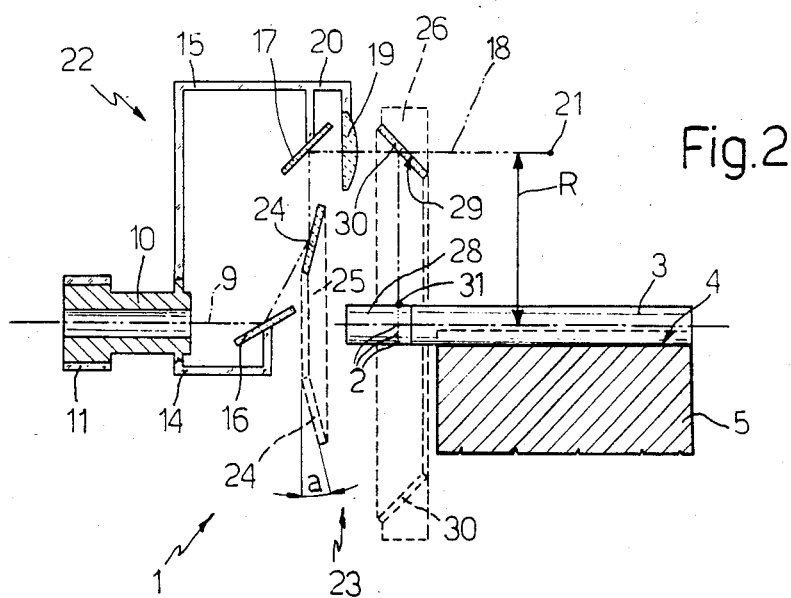
FIG. 2 shows a side view of the FIG. 1 device.

Device 1 comprises a continuous laser source 6 designed to emit a continuous beam 7 reflected by a fixed mirror 8 along an axis 9 parallel to the axis of rotation of drum 5 and coinciding, as shown in FIG. 2, with the position assumed by the axis of each cigarette 3 when the latter reaches the centre line of a piercing arc corresponding to the circular distance travelled by cigarettes 3 on drum 5 and along which holes 2 are pierced.

Device 1 also comprises a tubular body 10 mounted so as to turn round its own axis coinciding with axis 9.

Tubular body 10 is provided with an outer ring 11 engaging with an output pinion 12 on motor 13 designed to drive body 10 at a given constant speed.

From the end of body 10 facing drum 5 extend two arms, 14 and 15, supporting respective reflecting elements or mirrors, 16 and 17, the former of which is designed to intercept the beam 7 from body 10 and divert it outwards in a direction essentially perpendicular to axis 9.

As shown in FIG. 2, mirror 17 is positioned so as to divert beam 7 along axis 18 essentially parallel with axis 9 and coinciding with the optical axis of focusing lens 19 supported on arm 20 integral with arm 15, the said lens being designed to focus beam 7 on a point 21 which, if the focused beam was not diverted further, would turn round axis 9 at the same speed as mobile unit 22 comprising tubular body 10, arms 14, 15 and 20, mirror 16 and 17 and lens 19.

Device 1 also comprises a fixed reflecting member 23, in turn, comprising a first number of reflecting elements or mirrors 24 constituting the faces of a reflecting ring or body 25 essentially in the form of an irregular pyramid having its axis essentially coinciding with axis 9.

Reflecting member 23 also comprises a fixed ring 26, essentially coaxial with axis 9 and divided into two parts by two slots 27 designed to allow the passage of filters 29 on cigarettes 3 projecting from drum 5.

The inner surface 29 of ring 26 is fitted with a second number of fixed reflecting elements or mirrors 30 arranged essentially evenly round axis 9.

On device 1, beam 7 is diverted by mirror 16 successively on to one of mirrors 24 which, together with the perpendicular of axis 9, form different angles a, as described in more detail later on.

When struck by beam 7, each mirror 24 diverts it on to mirror 17 which, in turn, reflects it, by means of lens 19 and parallel to axis 9, on to a corresponding mirror 30. When struck by beam 7, each mirror 30 diverts it, in a direction essentially perpendicular to axis 9, on to the cigarette 3 on the piercing arc.

As already stated, without mirrors 30, beam 7 would continue travelling parallel to axis 9 and would be focused on point 21 at the distance R from axis 9.

On device 1, by carefully selecting the angles a formed by mirrors 24 and the peripendicular of axis 9, focus 31 can be made to coincide with a specific point on the outer surface of filter 28 being pierced, for as long as beam 7 sweeps each pair of corresponding mirrors 24 and 30, and can be made to move with the said point in such a manner that the relative speed of cigarette 3 travelling over the piercing arc and focus 31 relative to each pair of mirrors 24 and 30 is essentially zero, thus providing for essentially round holes 2.

In other words, by turning tubular body 10 at such a speed that mobile unit 22 makes a complete turn round axis 9 in the time taken for cigarettes 3 to move forward one step, i.e. the distance between two adjacent cigarettes 3 on drum 5, beam 7 sweeps mirrors 24 and corresponding mirrors 30 in succession, the latter being the same in number as mirrors 24 and holes 2 for piercing.

Throughout the time taken for beam 7 to sweep one of mirrors 24, focus 31 is kept in a fixed position on cigarette 3 in which it pierces a hole 2 as it moves along with it, after which it moves to another position, again moving along with cigarette 3, when beam 7 is caused to strike the next mirror 24.

To understand how device 1 can do this by simply selecting carefully angles a formed by mirrors 24 and the perpendicular of axis 9, the movement of device 1 should be divided into two separate stages, the sum of which gives actual movement of the device, and the effects of each examined separately.

To simplify the following analysis as far as possible, only the movement imposed in both cases on focus 21 will be examined, in that the actual focus 31 is merely a reflected image of it.

The actual movement of device 1 can be considered as being the sum of a first stage, in which both mobile unit 22 and reflecting body 25 turn round axis 9 at the same speed Q, and a second stage in which mobile unit 22 is stationary and reflecting body 25 turns round axis 9 at speed $(-Q)$.

In the first of the said stages, beam 7, instead of sweeping mirrors 24, strikes one of them in a fixed position, and focused beam 7, reflected by mirror 17, turns at speed Q round axis 9, keeping itself parallel. Consequently, focus 21 travels along an essentially circular trajectory round axis 9 so that, if V1 is the speed of focus 21 in the said fist stage, this gives:

$$V1 = QR \tag{1}$$

Figure 3:
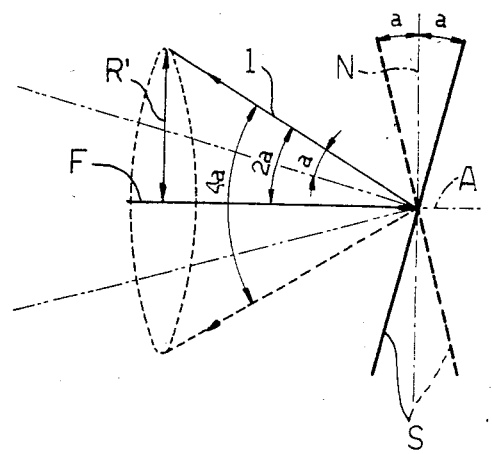
FIGS. 3, 4 and 5 show diagrams in perspective illustrating operation of the device in FIGS. 1 and 2.
Figure 4:
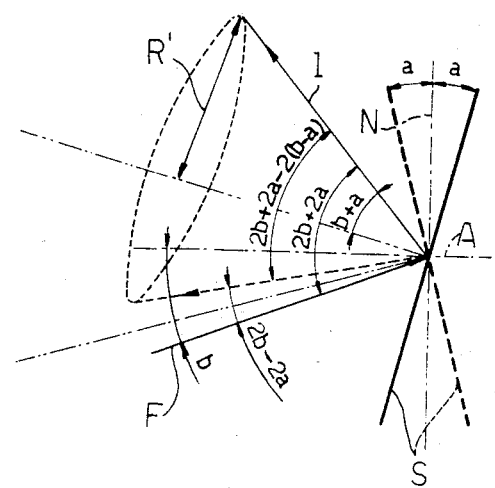
Figure 5:
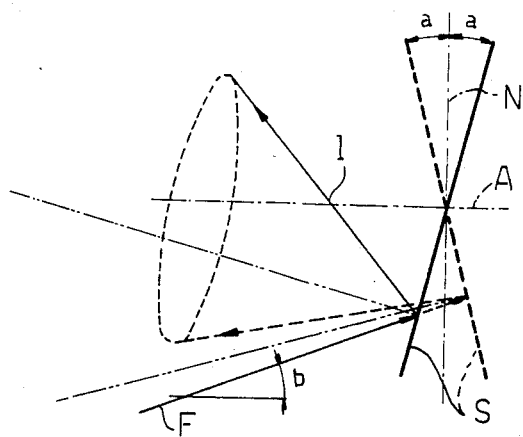

As for the second stage in which unit 22 is stationary and reflecting body 25 turns round axis 9, reference must be made to FIGS. 3, 4 and 5 for working out the formula governing movement of focus 21.

FIG. 3 shows a mirror S mounted so as to turn round axis A and forming angle a with perpendicular N of the said axis. A beam F, directed on to mirror S along axis A, when mirror S is in the first stationary position shown by the continuous black line in FIG. 3, is reflected in such a direction as to form an angle 2a with beam F itself.

When mirror S is turned 180° (dotted line), beam F is reflected in another direction forming another angle 2a with beam F.

Thus, as mirror S is turned 180° round axis A, the reflected beam describes the surface of a cone having an aperture of 4a and coaxial with axis A.

If we examine FIG. 4, we can see that beam 4 no longer coincides with axis A but forms with it an angle b the tip of which coincides with the intersection of axis A and mirror S.

In conformance with the laws of reflection, as mirror S is turned round axis A, the reflected beam describes the surface of a cone the axis of which forms an angle (a+b) with incident beam F and the aperture of which is given by:

$$(2b+2a)-(2b-2a)=4a \tag{2}$$

If we now examine FIG. 5, we see that incident beam F is not only inclined in relation to axis A but also has its point of incidence on mirror S shifted in relation to the intersection of mirror S and axis A.

In this case, the reflected beam no longer describes the surface of a perfect cone, but that of a conical envelope the aperture of which, nevertheless, is still essentially equal to 4a.

If we now examine FIG. 4, assuming that it is reflecting body 25 that is turning while unit 22 is stationary, beam 7 reflected by mirro 16 is inclined in relation to the axis of rotation 9 and encounters, in succession, mirrors 24 at points some distance from axis 9.

The reflection example in FIG. 5 thus illustrates the manner in which beam 7 is reflected by mirrors 24.

To be more precise, as the effect of mirror 17 is none other than to amplify the movement of the beam reflected by mirrors 24, it can be said that, in the case of the second stage examined, focus 21 moves round axis 9 in n number of separate arcs, n being the number of mirrors 24. The beams in the said arcs vary from one arc to another and can easily be deduced from any one of FIGS. 3, 4 and 5 in which the cone described by the reflected beam has a base circle with a radius R' of:

$$R' \simeq 2a1 \tag{3}$$

where 1 is equal to the length of the side of the cone and, in the case of FIG. 2, is equal to the length of the beam 7 portion between mirror 24 and focus 21.

In other words, the beams in the said arcs vary according to angle a of the relative mirrors 24 and are travelled along by focus 21 at a speed V2 of:

$$V2 = (-2a1Q) \tag{4}$$

From equations 1 and 4), we can calculate the angle a/° mirror 24 must have for keeping focus 21 stationary in space as long as the said mirror 24 is being swept by beam 7.

That is:

$$V1 + V2 = 0 = Q R - 2 Q l\, a/° \tag{5}$$

$$R/2\, 1 = a/° \tag{6}$$

As focus 21, and consequently, also reflected image 31, is not required to remain stationary at a specific point for each mirror 24, but is required to move so as to compensate for the movement of cigarettes 3 over the piercing arc or step, the angle of mirrors 24 will be equal to:

$$a = a_f'' + a_f' \cos c \quad (7)$$

where c is the angle of rotation of mobile unit 22 round axis 9 and $a_f'$ is given by:

$$P/2\pi R = a_f'/a_f'' \quad (8)$$

$$a_f' = a_f'' P/2 \pi R \quad (9)$$

where P is the length of the step. From formulas 6,7 and 9, it follows that $a = (2\pi R + P \cos C)/4\pi 1$ is derived.

On device 1 as described above, the results examined, which amount to piercing perfectly round holes 2, are achieved using a continuous instead of a pulsating laser source 6, beam 7 being "pulsated" by reflecting member 23, thus providing for considerable saving in energy and a drastic reduction in the size of source 6.

We claim:

1. Piercing device (1) for piercing ventilating holes in cigarettes (3) or similar smoking commodities supported on a feeding drum (5) assembled in rotary manner round an axis, the piercing device comprising a laser source (6) and an optical reflecting and focusing system designed to divert the beam (7) emitted by the said source (6) and focus it, in succession, on specific points on the surface of each said cigarette (3), while the latter is travelling crosswise in relation to its own axis round the axis of rotation of the said drum (5); the said laser source (6) being designed to emit a continuous beam (7) along a fixed axis (9) parallel with the axes of the said cigarettes (3) and arranged along, the path followed by said cigarettes, said optical system comprises a mobile reflecting and focusing unit (22), assemlbed in rotary manner round the said fixed axis (9), and a fixed reflecting member (23) comprising two rings (25, 26) of reflecting elements (24, 30) arranged round the said fixed axis (9); the elements (24) on one said ring (25) being optically inserted between two reflecting elements (16, 17) on the said mobile unit (22) and forming, with the perpendicular of the said fixed axis (9), angles varying from one element to another according to the formula $a = (2\pi R + P \cos c)/4\pi 1$.

2. Device according to claim 1, characterised by the fact that the said mobile unit (22) comprises a first mirror (16), intersection the said fixed axis (9) for diverting the said beam (7) selectively and successively on to the said reflecting elements (24) on the said fixed reflecting member (23), and a second mirror (17) designed to receive the beam (7) reflected by the latter and divert it in a direction essentially parallel to the said fixed axis (9).

3. Device according to claim 2, characterised by the fact that the said mobile unit (22) also comprises a focusing lens (19) arranged downstream from the said second mirror (17) in the propagation direction of the said beam (7).

4. Device according to claim 3, characterised by the fact that the reflecting elements (30) on the other (26) of the said rings (25, 26) are arranged in such a manner as to intersect selectively and successively the optical axis of the said lens (19), and are arranged downstream from the same in the propagation direction of the said beam (7) so as to divert the latter towards the said fixed axis (9).

5. Device according to claim 1, characterised by the fact that the said fixed reflecting member (23) comprises a reflecting body (25) essentially in the shape of an irregular pyramid with its axis essentially coinciding with the said fixed axis (9); each side face on the said pyramid being reflecting and constituting a respective said reflecting element (24) on the said first ring.

\* \* \* \* \*